2 Sheets—Sheet 1.

K. KNOTT.
STOCK-CAR.

No. 175,714. Patented April 4, 1876.

WITNESSES:
John Goethals
A. F. Roberts

INVENTOR:
O. F. Knott
BY
ATTORNEYS.

N. PETERS, PHOTO-LITHOGRAPHER, WASHINGTON, D.C.

2 Sheets—Sheet 2.
K. KNOTT.
STOCK-CAR.
No. 175,714. Patented April 4, 1876.
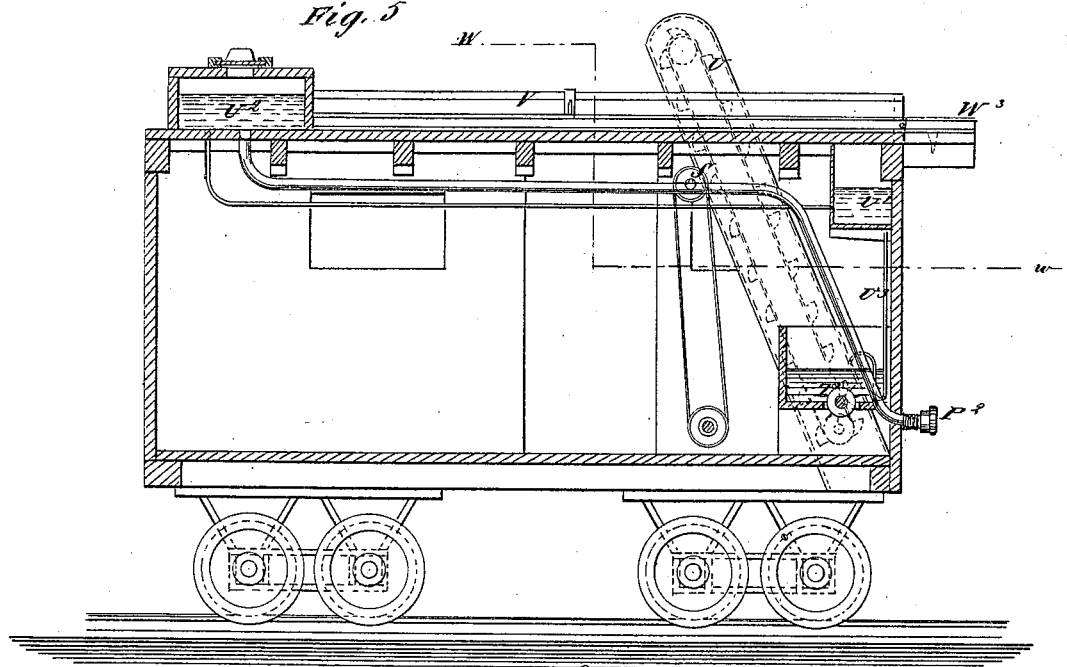
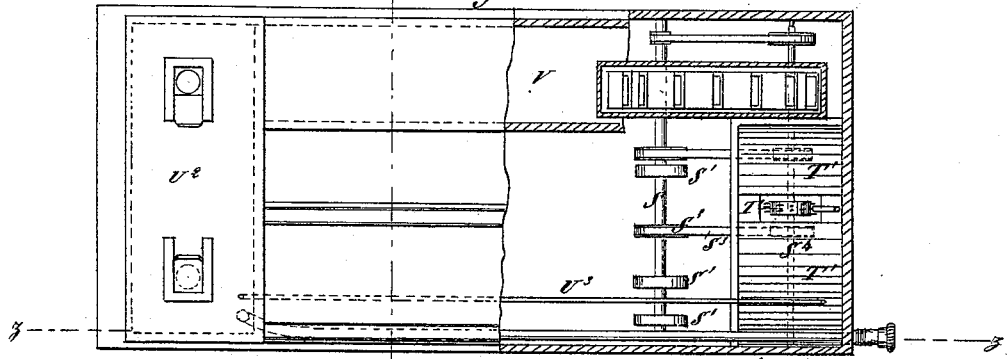
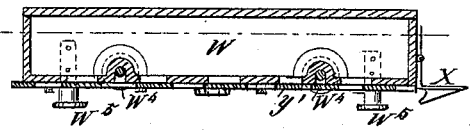
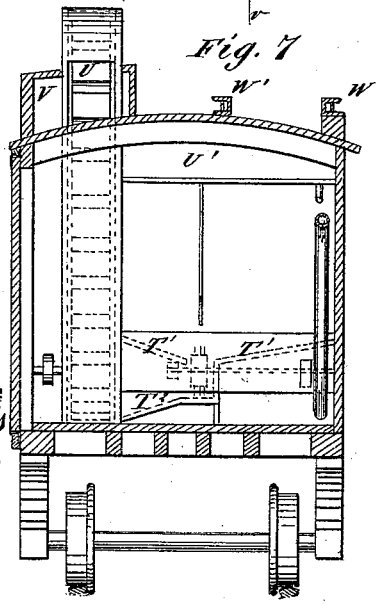
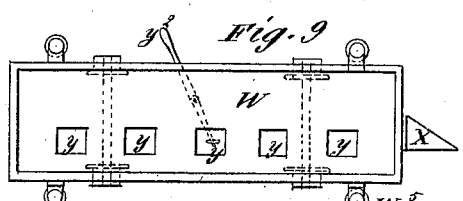
WITNESSES:
J. Goethals
A. F. Roberts
INVENTOR:
K. Knott
BY
Munn
ATTORNEYS.

UNITED STATES PATENT OFFICE.

KENNARD KNOTT, OF LONDON, CANADA.

IMPROVEMENT IN STOCK-CARS.

Specification forming part of Letters Patent No. 175,714, dated April 4, 1876; application filed February 14, 1876.

*To all whom it may concern:*

Be it known that I, KENNARD KNOTT, of London, in the Province of Ontario and Dominion of Canada, have invented new and Improved Cattle-Cars, of which the following is a specification:

My invention consists of cars constructed in stalls, together with contrivances for opening and closing the partitions between the stalls from the top of the car; also means for watering the cattle along the whole train from a tank on tender; and also means for conveying food from the tender along the top of the train to the stalls, so as to keep the cattle well fed and watered while in transit, to render them comfortable, and at the same time keep them in good and improving condition instead of subjecting them to shrinkage by deprivation of sustenance, as in the common method of transportation.

The invention also comprises contrivance for working cutting, mixing, and elevating apparatus in the tender, by power obtained from one of the axles of it, for conveniently and economically preparing and handling the food.

From the tender the food is elevated, when properly prepared, to a bin on the top, from which it is shoveled into a car which runs along the top of the train on rails and drops the feed into the mangers, and the water is conducted by a pipe, the pipe and the rails both having suitable detachable elastic and extensible joints for connecting between the cars.

Figure 1:
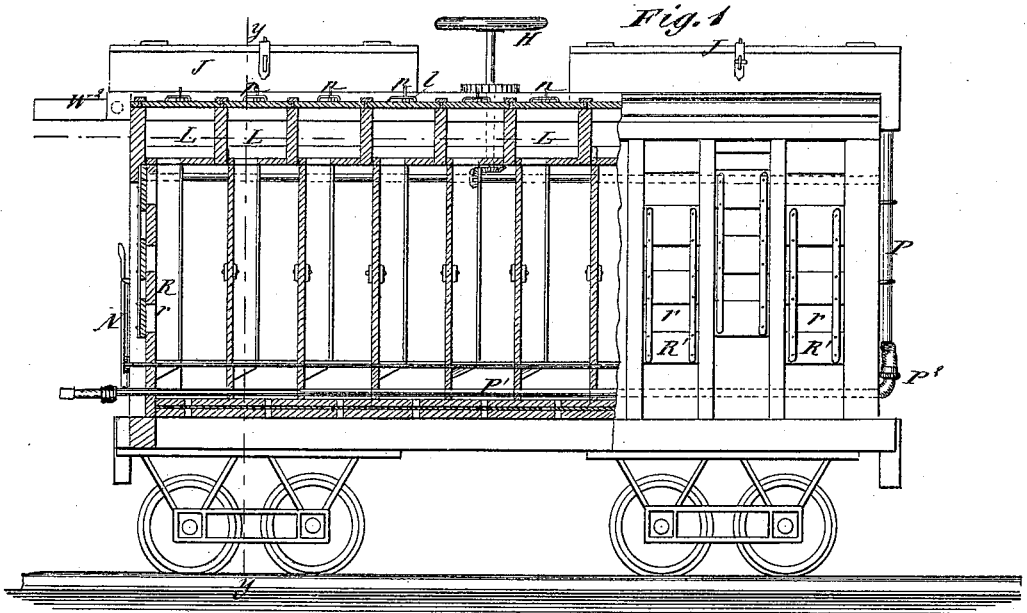
Figure 2:
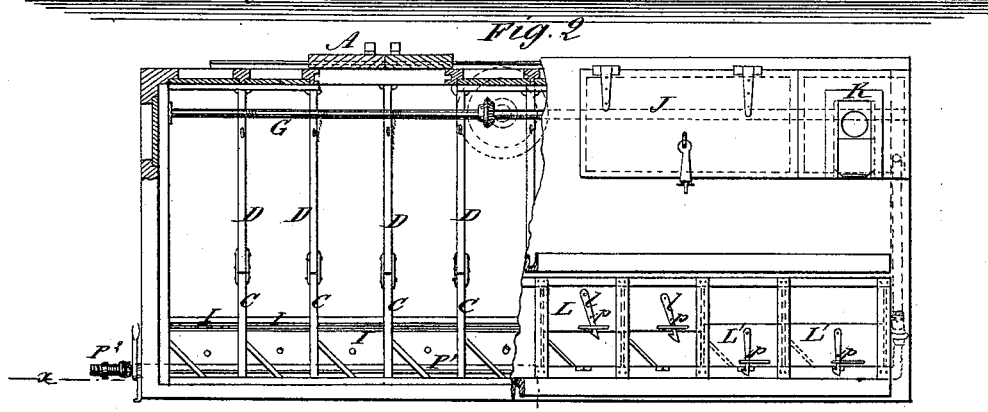
Figures 3, 4:
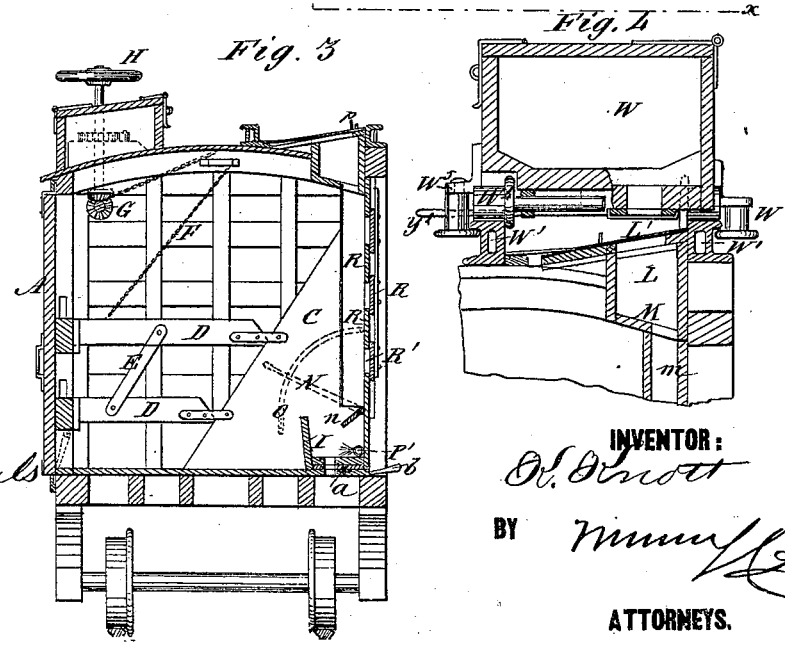

Figure 1 is partly a longitudinal sectional elevation and partly a side elevation of my improved cattle-car, the section being taken on line $x\ x$, Fig. 2. Fig. 2 is partly a top view and partly a horizontal section. Fig. 3 is a transverse section taken on line $y\ y$, Fig. 1. Fig. 4 is a transverse section of the car for conveying the feed along the train, and a detail of a cattle-car in section. Fig. 5 is a longitudinal sectional elevation of the tender taken on line $z\ z$ of Fig. 6. Fig. 6 is partly a horizontal section and partly a top view of Fig. 5, the section being taken on line $w\ w$. Fig. 7 is a transverse section on line $v\ v$ of Fig. 6. Fig. 8 is a longitudinal sectional elevation of the car for conveying the feed along the train; and Fig. 9 is a top view with the cover removed.

Similar letters of reference indicate corresponding parts.

A represents sliding panels which are in fact the doors of the car through which the beasts are driven.

A series of fixed partitions, C, divide this car into as many separate parts or stalls along the opposite side as may be required. Connected to these partitions by suitable hinges are the movable bars D, constructed as shown of two or more bars parallel to one another and connected by the adjustable tie-bar E.

Before the cattle are driven in, these bars are raised by means of chains or ropes F attached thereto, the other ends of which chains or ropes pass over a series of pulleys, $f$, near the roof, and are thence carried to a shaft, G, running the whole length of car near the top.

This shaft is operated by means of a crank or wheel, H, on the top actuating a bevel-wheel which meshes into a pinion on the shaft. When the bars D are required to be lowered a dog is released from a ratchet-wheel on perpendicular shaft of wheel H, and the weight of the bars causes them to drop into place again.

When loading cattle in a car built to carry twenty head, ten are driven into one entrance and ten into the other. All the bars D are up except the center one, which is a fixture; the animals are driven into position with heads toward the side of the car opposite to the one they enter by; the panels A are closed and the bars D lowered in the manner described.

In front of each stall is a trough, I, from which the beast eats and drinks during the journey. Each trough is separate from the others, and is supplied by the following contrivances:

On the top of the car bins J are constructed to contain prepared food, together with a covered tank, $k$, for water. These bins and tanks occupy one side of the roof of car, as shown in Figs. 1 and 2. The opposite side is constructed with a series of traps, L, and sliding covers L', one over each trough, and consequently one for each animal.

These covers when closed are fastened by spring catches $l$, when open. A sloping false bottom, M, is seen, on which the food is placed, falling, as consumed, down a spout, $m$, in the corner, and delivering into the trough I.

These spouts $m$ are regulated so as to lie either open or shut by means of flaps or valves $n$ at bottom, attached to a continuous shaft, and governed by a lever, N, working in a quadrant, O, at end of car, on outside, as shown in Figs. 1 and 3.

When it is requisite to water the animals the lever N will be raised and the spout $m$ closed. Water is then allowed to pass from the tank $k$, on top, through a suitable pipe, P, at side, connected by screw-couplings $P^2$ to another pipe, $P^1$, running the whole length of car, at bottom of troughs, and the water fills these troughs from a series of perforations made at intervals in the iron pipe $P^1$.

At the bottom of the side of car, at rear of the beasts, will be placed a series of doors, moving on hinges, and providing an easy mode of cleaning out the stalls.

The sides and ends of car, where not otherwise inclosed by the sliding panels A, are filled in with slats R, alternate with open spaces $r$, for ventilation.

These open spaces are closed when requisite by raising the outer series of movable slats R′, connected by rigid straps or bars, and arranged with alternate slats and spaces corresponding to the slats R and spaces $r$, so that the car can be left open or entirely closed, or any modification used to suit the temperature.

The completeness of the devices and arrangements of the car render it capable of forming one of a train of ordinary freight-cars, but for the purpose of supplying a train of cattle-cars a tender is necessary, constructed and arranged in the following manner: In this tender is packed the material for feed, such as bales of pressed hay, corn, roots, bran, &c. At one end machinery is arranged to cut the hay and straw into fine chaff, reduce the roots to pulp, and crush corn into meal.

The several machines to effect these operations are not shown in annexed drawings, as they form no part of this patent. They are operated by power transmitted from the axle of the traction-wheels of tender to the shaft S, near the top of tender, to counter-shaft near the bottom floor of tender, and the revolutions of pulleys $S^1$ arranged on this shaft drive the straw-cutter and other machines by bands connected thereto. One of these pulleys $S^2$, by means of band $S^3$, drives the center-shaft $S^4$, which operates the mixing-wheel T. This wheel is shaped as shown of points or prongs protruding from its periphery. As the food is prepared by the various machines it is cast on the sloping platform T′, down which it slides to the wheel T, and after being mixed as required, falls upon and passes down another sloping platform, $T^2$, to an elevator, U.

This elevator is constructed in a compact manner, so as to occupy only a small space in the corner of tender, and by means of a band and bucket, driven by the shaft S, elevates the prepared feed to the roof of tender and deposits it in a large covered receptacle or bin, V, placed there to receive it.

As a further means of properly preparing the feed before it leaves the platform T, a tank $U^1$, supplied with water by a pipe leading from another tank, $U^2$, on the roof of tender, is placed directly over the sloping platform, and from this tank $U^1$ a pipe, $U^3$, is laid, the lower end projecting over the mixing-wheel. This pipe has a series of fine holes perforated in it for the purpose of sprinkling the feed and so assisting in the mixing of it.

The platform is finished with a breastwork to prevent the feed from scattering, and the wheel is covered by a cap for the same purpose.

The feed having been deposited in the bin V on roof, by the elevator U, is removed thence from time to time, as required, and loaded on a covered truck, W, which is to convey it from car to car, along the roofs, on the tops of which it runs. In order to allow of this a tramway, $W^1$, is laid the entire length of the train on the roofs of tender and cars. The connection of this train, from tender to car and from car to car, is perfect, so that when the bunters are close together the ends of rails of train are within an inch of each other. The ends of one pair are formed hollow and square, to receive square keys or bars $W^2$, projecting from end of adjacent rails. These bars $W^2$ are attached to the rails by ball-hinges, so as to allow of perfect freedom of motion, and they are in length equal to the extreme stretch of the couplings. The ends of rails $W^3$ made to receive the bars $W^2$ are hollow, and square in shape, as already stated, and a portion of the top and side, in length equal to bar $W^2$, is made to lift up so as to admit of the bar being dropped in. When they are so placed the sides and top of the rails cover them, and they are secured by a spike or any suitable fastening easily removed. Then, when starting, traveling, &c., the ball-hinge and bar allow of any extention of coupling, &c. The feed-truck W is pushed along this train on the wheels $W^4$, and it is prevented from becoming displaced by another set of flange-wheels, $W^5$, pivoted to the sides of truck with their faces downward, their flanges running in a groove on the outside of each rail of tram. When feeding, this tram runs along the top of the train from one car to another, passing on the train directly over the traps and covers L, already described.

To the outside of forward end of truck, near the bottom, is attached a hinged arm, X, of the shape shown in drawing. As it moves forward the point of this arm X strikes against the spring-catches $l$ on covers, and its wedge-shaped edge, also pressing against the point $p$ projecting upward from each of those catches, pushes back the sliding covers so as to leave the traps opens for the feed, which is passed through by the following means:

In the bottom of the truck a number of openings, Y, are formed, corresponding in size to the traps in roof of car; and slide $Y^1$, under the bottom, furnished with similar openings, and operated by a lever, $Y^2$, at side, permits of the passing down of the feed through the traps. Thus, when the truck is moved along the rails its arm X opens and pushes back a certain number of the covers $L^1$. The lever $Y^2$, at side, is then pushed back, and the slide $Y^1$, at bottom, is operated by it, so that the openings in it are opposite the openings Y in bottom of truck, which are now directly over the open traps. A sufficient amount of feed is thus allowed to fall upon the false bottom M of those traps, whence it gradually falls, as consumed, to the troughs I, in front of each animal. The lever then closes the slide, and the car moves on to the next series of traps where the operation is repeated until the whole train of cars is supplied with feed, or sufficient to last twenty-four hours.

The water for the cattle is supplied from the tank $U^2$, on the top of the tender. An iron pipe, $P^1$, already mentioned, runs the whole length of train, the connections from car to car, and to the pipe P, leading from tank, being made by rubber hose with screw-joint $P^4$ in the center sufficiently long to allow for extention of the couplings.

For long journeys, or when a large number of beasts have to be provided for, one or more freight-cars to contain materials for feed, &c., will be attached in addition to the tender.

The surplus water is passed through the bottom of troughs and car by means of a sliding valve, $a$, the whole length of car. This sliding valve is operated upon by a lever, $b$, in the center and outside of car.

Having thus described my invention, I claim as new and desire to secure by Letters Patent—

1. The combination, in a railway-car, of sliding panels A, fixed partitions C, movable bars D, tie-bar E, ropes or chains F, pulleys $f$ G, shaft $G^1$, and wheel H, combined and operating substantially as and for the purpose described.

2. The combination, with shafts S $S^4$, pulleys $S^1$ $S^2$, and board $S^3$, of the mixing-wheel T, platforms $T^1$ $T^2$, tanks $V^1$ $V^2$, and pipe $V^3$, as and for the purpose described.

3. In a cattle-car, the combination, with fixed slats R, having open spaces $r$ between them, of the adjustable slats $R^1$, connected by rigid bars or rods, as shown and described.

4. In a cattle-car, the combination of elevator U operated by band connection with the axle, of the sliding-feed delivery-board $T^2$, the receiving-bin V at top of the car, as shown and described.

5. In a railway-car the combination of the bins J and tank K, traps and covers L $L^1$, with spring-catches $l$, and points $p$, sloping bottom M, pipes P $P^1$, couplings $P^2$, all combined and operating substantially as and for the purpose set forth.

6. The combination, on cars and tender, of a tramway, $W^1$, having the rails joined by alternate open ends $W^3$, and keys or bars $W^2$, constructed substantially as shown and described.

7. In combination with the above trams, the truck W, having traction wheels $W^4$, flange-rails, and guide-wheels $W^5$, hinged arm X, slide $Y^1$, and lever $Y^2$, all constructed and operating substantially as shown and described.

8. The valve $a$, and lever $b$, combined with the troughs I, substantially as described.

KENNARD KNOTT.

Witnesses:
FRANCIS LOVE,
W. H. BARTRAM.